(12) United States Patent
Baumoel

(10) Patent No.: US 6,644,132 B1
(45) Date of Patent: Nov. 11, 2003

(54) FLOW PROFILE CONDITIONER FOR PIPE FLOW SYSTEMS

(76) Inventor: Joseph Baumoel, 104 Fairway View Dr., The Hamlet, Commack, NY (US) 11725

( * ) Notice: Subject to any disclaimer, the term of this patent is extended or adjusted under 35 U.S.C. 154(b) by 0 days.

(21) Appl. No.: 09/566,312

(22) Filed: May 8, 2000

Related U.S. Application Data

(60) Provisional application No. 60/132,756, filed on May 6, 1999.

(51) Int. Cl.[7] .................................................. G01F 1/28
(52) U.S. Cl. .................................... 73/861.72; 73/861.74
(58) Field of Search ........................ 73/861.72, 861.74, 73/861.75, 861.83, 861.89

(56) References Cited

U.S. PATENT DOCUMENTS

| | | | | |
|---|---|---|---|---|
| 4,590,805 A | * | 5/1986 | Baird et al. ............... | 73/861.77 |
| 5,003,828 A | * | 4/1991 | van den Burg ............. | 600/539 |
| 6,053,054 A | | 4/2000 | Wusterbarth et al. .... | 73/861.28 |
| 6,199,434 B1 | * | 3/2001 | Cornil et al. ................. | 73/195 |

* cited by examiner

Primary Examiner—Edward Lefkowitz
Assistant Examiner—Corey D. Mack
(74) Attorney, Agent, or Firm—F. Chau & Associates, LLP

(57) ABSTRACT

The present invention includes a flow conditioning apparatus for conditioning flow for accurate flow measurements. The flow conditioning apparatus is installed in a fluid stream to provide a flow pattern which is capable of flow measurement. In one embodiment, the flow pattern resembles plug flow or flat flow in a pipe. The apparatus for conditioning flow in a pipe, in accordance with the present invention, includes a centrally disposed hub with a plurality of angled members attached to the hub on at a first end portion of the angled members. The angled members include a second end portion extending radially outward from the hub. The second end portion of the angled members is attached to a ring such that the plurality of angled members cause a fluid to swirl within the pipe to condition a flow in the pipe.

21 Claims, 6 Drawing Sheets

FLOW PROFILE CONDITIONER FOR PIPE FLOW SYSTEMS

CROSS REFERENCE TO RELATED APPLICATION

This application claims priority to Provisional Application Ser. No. 60/132,756 filed May 6, 1999.

BACKGROUND

1. Field of the Invention

This disclosure relates to flow conditioning in pipes and, more particularly, to an apparatus for conditioning flow characteristics in pipe flow systems.

2. Description of the Related Art

Measuring flow in pipes may be performed in many ways. On such way includes sonic energy propagated into a fluid stream and measuring transit time to determine flow characteristics. There are primarily two types of transit-time ultrasonic flowmeters, the clamp-on type and the wetted transducer type. The clamp-On type is limited to either diametric direct or reflect transducer mounting for each sonic path. The wetted transducer is capable of either of these or chordal mounting.

It is well known that the shape o the flow profile as a liquid flows down a pipe is a function of the Reynolds number, a function of flow rate and liquid viscosity. This shape is "pointier" for lower Reynolds numbers and flatter for higher Reynolds numbers, transitioning to "Turbulent" or flatter shapes to "Laminar" or "pointer" shapes occurs when Reynolds number increases to about 2000 to 4000 as it passes through the "Transition" region.

The calibration of transit-time flowmeters is affected by this shape or profile since the transit time difference between upstream and downstream travel is a linear function of the distance that the beam travels through each different velocity. The volumetric flow is obviously not linear with flow profile, since the area of high flow near the center of the pipe is much lower than the low velocities which apply near the pipe wall.

Since the shape of the flow profile usually has a known "mathematical" relationship with Reynolds number, it is possible to automatically correct for this relationship as the flow profile changes with flow rate if the viscosity of the liquid is known. The actual shape of the flow profile is known accurately only if the flow profile is "fully developed". Fully developed flow refers to a flow profile which has reached a steady state shape. This typically occurs at a distance of a number of pipe diameters of "straight run" pipe past any change in pipe diameter, change of pipe direction or obstructive disturbance.

Another flow profile characteristic is called "crossflow" which is a tendency for flow not to be primarily axial to the pipe, as occurs just past a pipe bend or obstructive disturbance. This is usually more disturbing to ultrasonic flowmeter accuracy since the basic flowmeter calibration assumes a known angle between the ultrasonic beam(s) and the pipe axis.

Only if the shape of the flow profile is known and properly compensated for mathematically, or conditioned by flow profile conditioners, and if crossflow is avoided or compensated, can an ultrasonic flowmeter reach its full potential for accuracy.

The "shape" of the flow profile is different from that predicted by the current Reynolds number prior to it being fully developed. If the upstream condition is, say, entry into a pipe from a large tank, the profile gradually transitions from a "flat" or "plug" flow shape, to that demanded by the Reynolds number. This also applies, in general, to the effect of a reduction or substantial increase in pipe diameter, both of which have the tendency to flatten the profile. However, if the upstream condition is a bend, either an in-plane or out-of-plane single or double elbow, the flow profile can change radically, displacing the center of flow from the center of the pipe, as well as flattening its shape and causing crossflow. Each such condition affects the relationship between the profile shape and the volume flow rate integration of the effect of the profile on the sonic beam's transit-time for sonic beam flowmeters. The flattening of the flow profile, in some cases, may be so profound as to cause a lower flow velocity in the center of the pipe, as compared to regions closer to the pipe wall. Therefore, flow profile effects, if not controlled, or compensated, can seriously affect accuracy of ultrasonic flowmeters.

Some of the flow profile conditions that need accommodation to achieve ultimate clamp-On transit-time flowmeter accuracy include:

a) Correction for the effect of the shape of the "standard" Reynolds number predicted flow profile, for flow volume integration;

b) Correction for the difference in the actual flow profile shape relative to the predicted Reynolds number related shape;

c) Correction for the displacement of the center of flow profile from the central axis of the pipe;

d) Correction for crossflow; and e) Correction for the effects of liquid swirl, usually induced as flow changes direction, as in an elbow, due to Coriolis forces.

Correcting or mitigating the effects noted above may respectively include:

a) Correction for the shape of the standard flow profile.

Since the shape of the "standard" flow profile shape is mathematically predictable, transit-time flowmeters may include a compensating algorithm. This results in changing the basic computed flow rate, which is predicated at "plug" flow, by an amount directly related to the actual effect of the predicted shape on flow calibration, resulting in elimination of any resultant flow profile error.

Since this compensation algorithm needs knowledge of Reynolds number, a site setup of the meter requires identification of the liquid viscosity and the pipe diameter. Together with the computed flow rate, this is sufficient information to compute Reynolds number, which is then fed into the flow profile calibration correction algorithm.

Note that in this case, where the flow profile is that which was predicted, and the computation of viscosity is accurate, only one sonic path is needed, since all diametric clamp on paths are symmetric, all being affected by a symmetric flow profile in an identical way.

b) Correction for aberration of the standard flow profile shape.

Since local pipe configuration sometimes aberrate the expected shape of the flow profile from that expected relative to the current Reynolds number, it is possible that the standard correction algorithm does not fully correct the flow profile error. In other cases, the actual Reynolds number is not known precisely, due either to the liquid's viscosity being unknown, or being highly variable.

c) Correction for the displacement of the center of flow profile from the central axis of the pipe.

In cases where the "axis" of the flow profile is displaced from the axis of the pipe, it is desirable to assure that the diametric clamp-on sonic beam is oriented so as to pass through the flow profile axis. This can generally be accomplished by orienting the clamp-on transducers in the plane of the bend, within two diameters of the bend itself. This may be difficult to do and may require several iterations.

Alternatively, one or more additional sonic paths may be employed, so as to assure that the higher flow rate which occurs on the flow profile axis is scanned by a sonic beam. This is more expensive than orienting a single path appropriately, as noted above. This is generally only recommended for applications involving a wide variety of different liquids, and in cases where extremely high accuracy is required under these difficult conditions.

d) Correction for crossflow.

As noted above, crossflow is a condition usually associated with the existence of a bend in the pipe, or some non-symmetric disturbance. The error crossflow causes is due to the axis of flow being divergent from the axis of the pipe.

By mounting the clamp-on transducers in "reflect" mount, crossflow error may be corrected, as the angle between the beam and the stream in the direct and reflected paths is equally increased and decreased respectively, thus substantially canceling out any error.

To assure in accomplishing this result it is desirable that the longer reflect mount path not result in excessive sonic signal attenuation. In cases where liquid is especially viscous, and capable of absorbing or scattering ultrasound, wide beam transducers are needed, as they are more efficient at injecting high levels of ultrasound into the liquid.

e) Correction for the effects of liquid swirl.

In clamp-on transit-time flowmeters, liquid swirl has no effect on calibration, since the sonic beam is diametric. However, liquid swirl tends to force the higher flow velocity components out towards the wall of the pipe, due to centrifugal force. This results in an "inverted" flow profile, with a "hole" of lower flow velocity in the center of the pipe, as opposed to the normal higher flow velocities in this region.

Therefore, a need exists for an apparatus which conditions liquids flowing in pipes such that flow measurements can be made accurately and reliably in a variety of different conditions. These conditions may include flows traveling through various pipe configurations, such as bends and elbows, tees, diameter changes, etc.

SUMMARY OF THE INVENTION

An apparatus for conditioning flow in a pipe, in accordance with the present invention includes a centrally disposed hub with a plurality of angled members attached to the hub on at a first end portion of the angled members. The angled members include a second end portion extending radially outward from the hub. The second end portion of the angled members is attached to a ring such that the plurality of angled members cause a fluid to swirl within the pipe to condition a flow in the pipe.

An apparatus for measuring flow in a pipe, in accordance with the invention, includes a pipe including a straight section. The pipe includes a disturbed fluid flow therein. A flow conditioning apparatus is mounted within the pipe and includes a centrally disposed hub, and a plurality of angled members attached to the hub on a first end portion. The angled members have a second end portion extending radially outward from the hub. The second end portion of the angled members is attached to a ring at the second end portion such that the plurality of angled members cause the disturbed fluid to swirl within the pipe to provide a conditioned flow in the pipe. A flow measurement device is mounted to the pipe to measure flow characteristics of the conditioned flow.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention relates to an apparatus for conditioning and compensating a flow profile within a pipe or tube. The present invention includes a flow conditioning device which is inserted into a fluid stream to provide a flow pattern which simulates a plug flow or provides another known flow pattern. In this way, a sonic flowmeter or other type flowmeter can more accurately measure flow characteristics in the pipe. Advantageously, the present invention can be installed close to bends, tees, obstructions, etc. which cause difficult to measure flow conditions, and the flow is conditioned in a rapid fashion to permit flow measurements. The present invention functions with little or no dependence on viscosity or temperature of the fluid in the pipe.

Figure 1A:
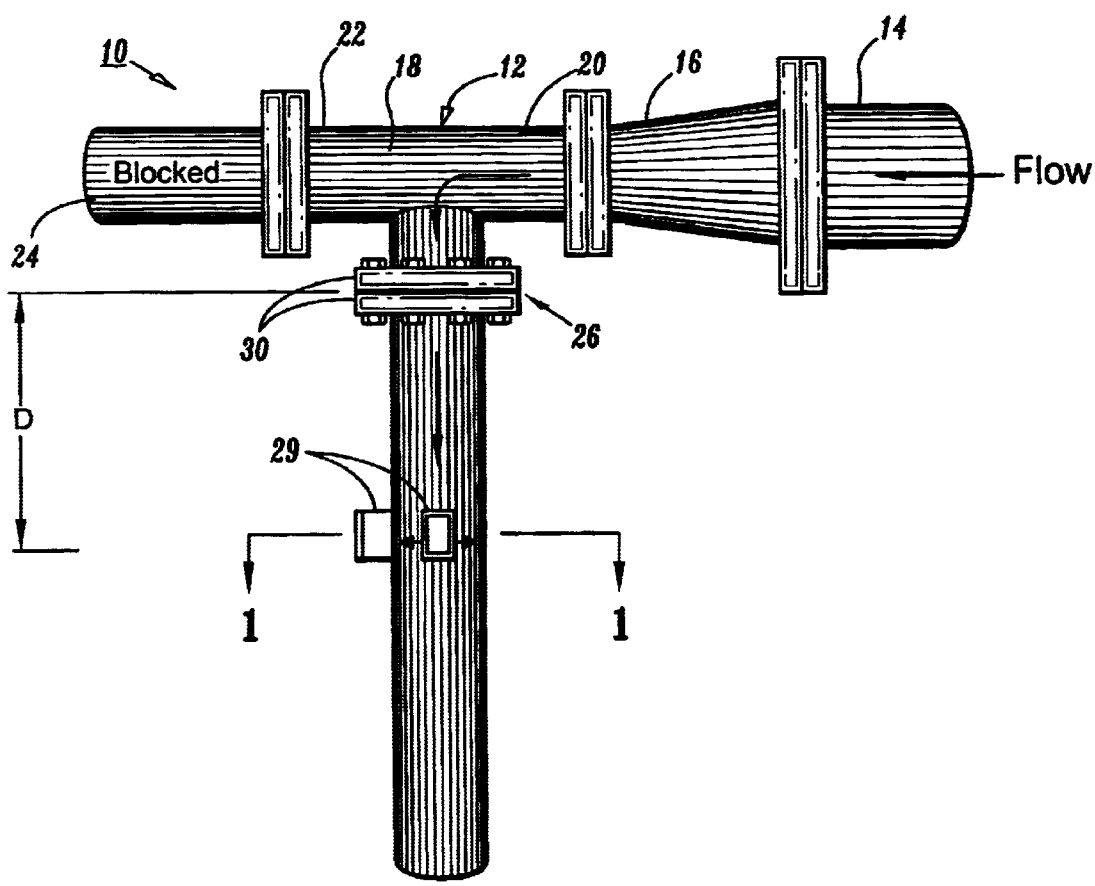
FIG. 1A is schematic diagram of a pipe system having a flow conditioning device installed in accordance with the present invention.

Referring now in specific detail to the drawings in which like reference numerals identify similar or identical elements throughout the several views, and initially to FIG. 1A, a flow conditioning device test configuration 10 is shown to illustratively describe the present invention. The illustrative test configuration 10 includes a pipe system 12 including a straight section 14 from which a fluid flow originates. In a preferred embodiment, pipe system 12 includes metallic pipes for carrying liquids. Other embodiments may include plastic or rigid non-metallic pipes. Straight section 14 is connected to a reducer 16 which necks down the cross-sectional area of the flow. Reducer 16 is one possible obstruction which disturbs fully developed flow in pipe system 12. A tee 18 is connected to reducer 16. Flow in pipe system 12 is directed through a portion 20 of tee 18. A portion 22 of tee 18 is blocked by a plug 24 to prevent flow in this direction. Flow through tee 18 is the source of additional disturbance to the flow in pipe system 12.

A flow conditioning device 26 is introduced into the flow stream to condition the disturbed flow in accordance with the present invention. In the embodiment shown in FIG. 1A, flow conditioning device 26 is introduced into the flow stream of pipe system 12 by attaching flow conditioning device 26 between two sections of pipe, namely between tee 18 and a straight section 28. Flow conditioning device 26 may include a plate having a hole pattern consistent with the hole patterns in pipe flanges 30. In this way, flow conditioning device 26 may be installed within the flow stream and securely held in position. Flow conditioning device 26 will be described in greater detail herein below.

Flow conditioning device 26 conditions the flow of the fluid in pipe system 12 by reducing the effective diameter of the pipe slightly, and by causing the fluid to swirl within the pipe. Both of these effects make the flow profile essentially immune to upstream pipe conditions (tee 18 and reducer 16) as well as to the viscosity of the fluid. By swirling the fluid in the pipe, flow conditioning device 26 creates a symmetric flow profile from which more accurate flow characteristic measurements may be made. In one embodiment, the flow profile is equivalent to plug flow. Accurate flow measurements can be made in this flow condition.

Figure 1B:
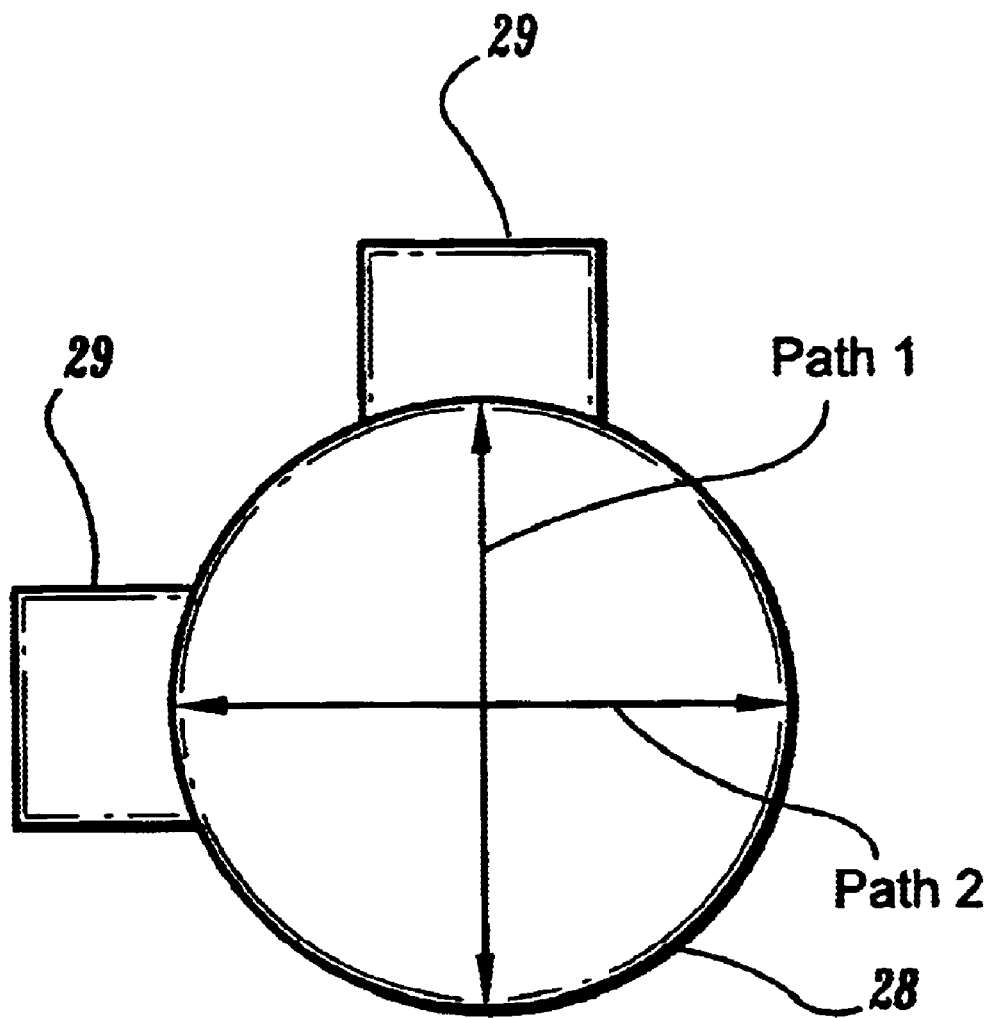
FIG. 1B is a cross-sectional view taken at section line 1—1 of FIG. 1A showing paths for flow measurement in accordance with the present invention.

Referring to FIGS. 1A and 1B, downstream of flow conditioning device 26 are flow meter(s) 29. Flowmeters 29 are separated from flow conditioning device 26 by a distance D. In a preferred embodiment, D is about 2 to 4 pipe diameters from flow conditioning device 26. Flowmeters 29 preferably include transit-time flowmeters employing sonic energy for determining flow. This type of flow meter is described in greater detail in U.S. Pat. Nos. 4,425,803 and 5,117,698, both incorporated herein by reference. Flowmeters 29 may employ reflected or direct modes of sonic measurement of the flow. Two flow paths are indicated in FIG. 1B and labeled Path 1 and Path 2. Flowmeters 29 include transducers which propagate sonic waves to measure the flow in straight section 28.

Figure 2:
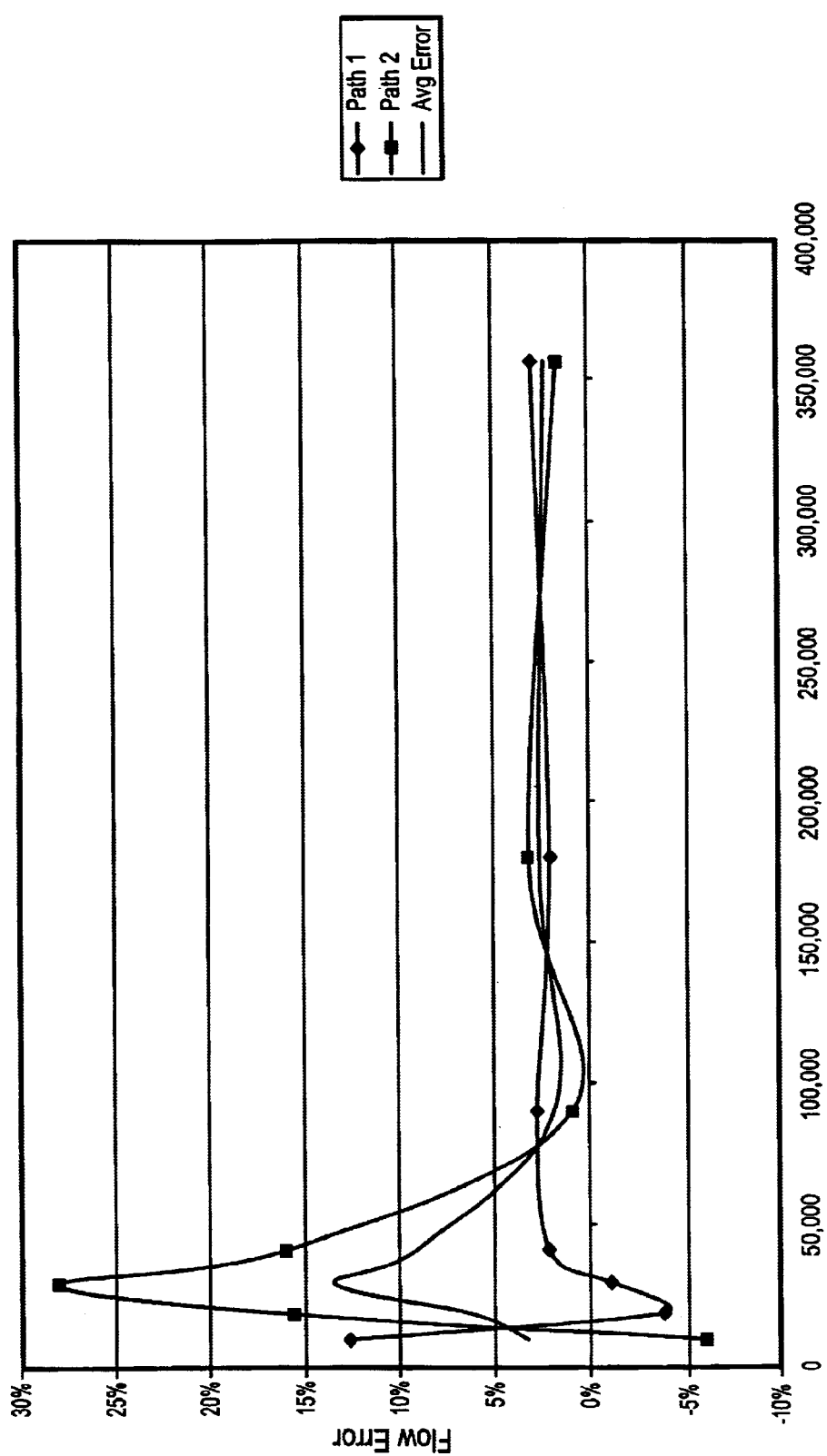
FIG. 2 is a plot of flow error versus Reynolds number for a pipe system without a flow conditioning device.

Referring now to FIG. 2, a plot of flow error versus Reynolds number for flow measured through Path 1 and Path 2 without a flow conditioning device 26 installed is shown. Distance D is about 4 pipe diameters away from flanges 30. Path 1 and Path 2 are in the plane of tee 18. At low Reynolds numbers flow error tends to be very high for Path 1 and Path 2 measurements. This is due to the disturbances of the reducer 16 and the bend in tee 16. Average flow error improves to about 2.5% at higher Reynolds numbers.

Figure 3:
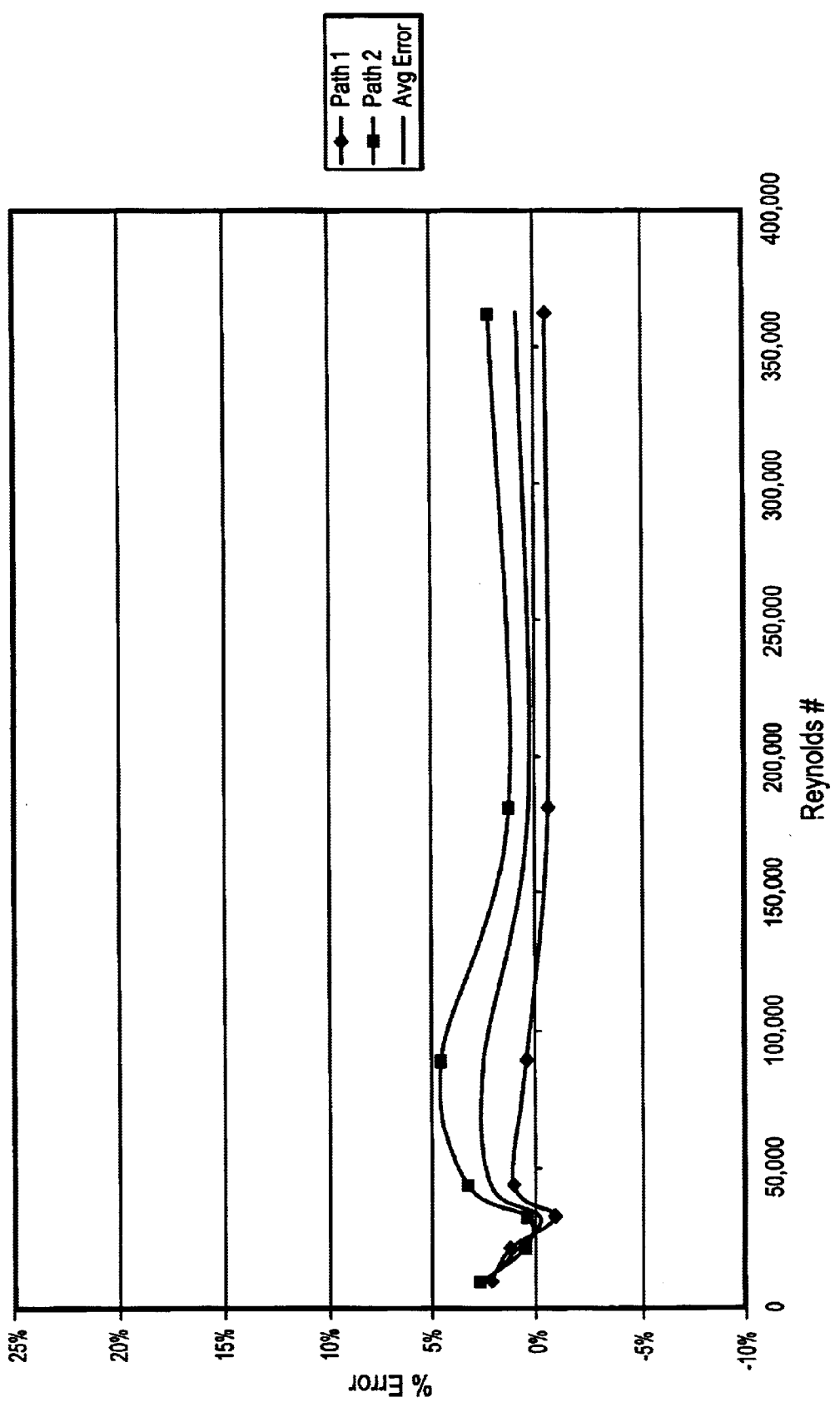
FIG. 3 is a plot of flow error versus Reynolds number for a pipe system having a flow conditioning device in accordance with the present invention.

Referring to FIG. 3, a plot of flow deviation (%error) versus Reynolds number for flow measured through Path 1 and Path 2 with a flow conditioning device 26 installed is shown. Distance D is about 4 pipe diameters away from flow conditioning device 26. Path 1 and Path 2 are in the plane of tee 18. At low Reynolds numbers flow error is markedly improved over the system without flow conditioning device 26. This is true for both Path 1 and Path 2 measurements. This is due to the conditioning of the flow provided by flow conditioning device 26. Average flow error improves to less than about 1% at higher Reynolds numbers and is less than 5% in all cases.

Figure 4:
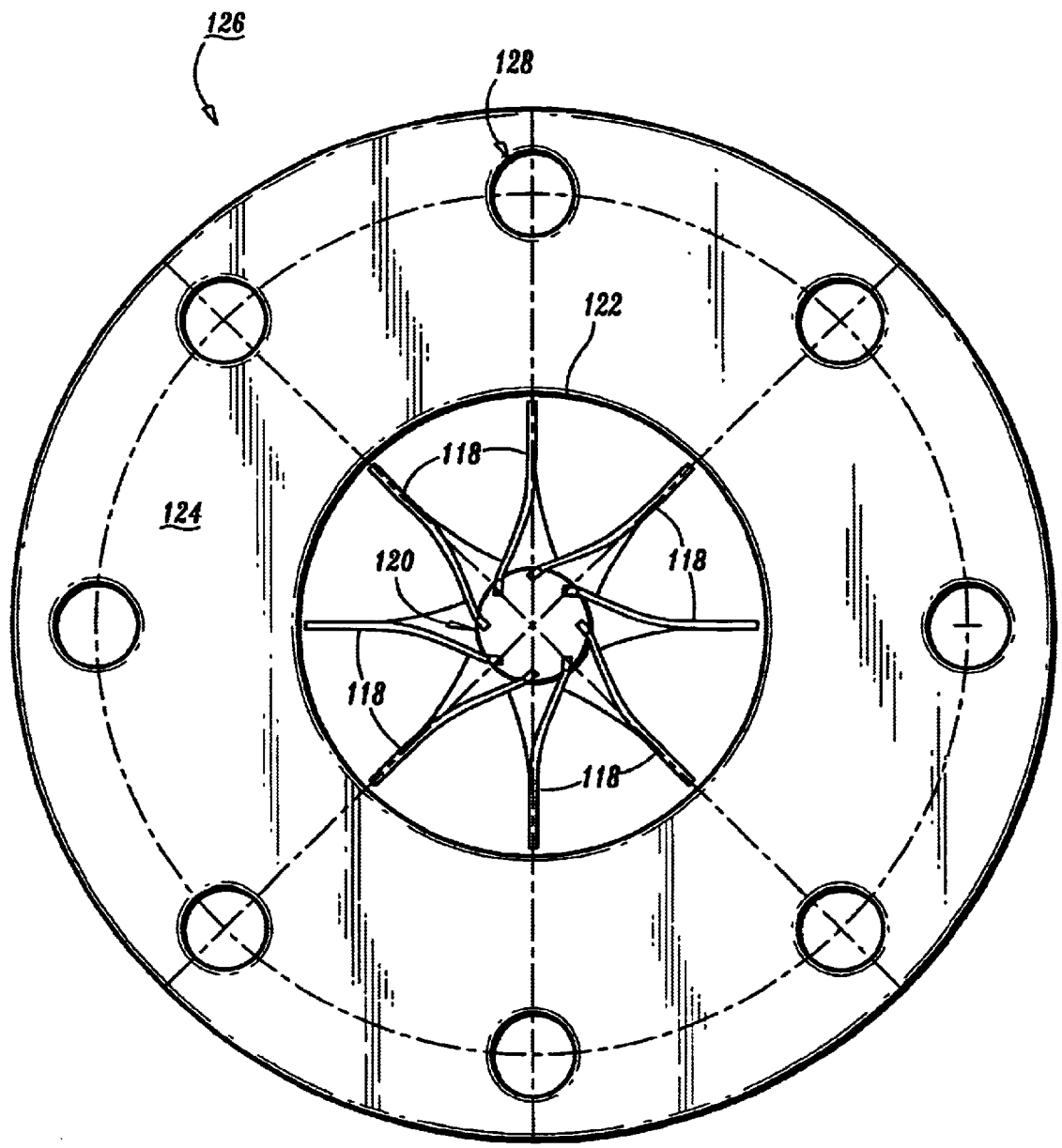
FIG. 4 is a front view of a flow conditioning device for use with flanged pipes in accordance with the present invention.

Referring to FIG. 4, one embodiment of a flow conditioning device 126 is shown. Flow conditioning device 126 is adapted to large pipes with flanged ends. Flow conditioning device 126 includes a hole pattern 128 corresponding to hole patterns of the pipe flanges to which it can be connected. Flow conditioning device 126 includes a plate portion 124 forming an inner diameter 122. Inner diameter 122 is preferably slightly smaller than the diameter of the pipe in which it will be used. A dowel, hub or guide 120 is centrally disposed within inner diameter 122 and maintained in that position by blades 118. Blades 118 may include twisted rectangular plates, contoured curved shapes or other shapes and curves which provide a swirling motion to the fluid flowing through the pipe into which flow conditioning device 126 is deployed. In one embodiment, blades 118 include rectangular plates twisted by about 30 degrees. The number of blades 118 may be as few as two, or as many as needed by the particular application to achieve the desired results. In preferred embodiments, the number of blades 118 are between 6 and 12.

Blades 118 are preferably permanently attached to plate 124 at inner diameter 122, for example by welding. Blades are also permanently attached to dowel 120, for example by welding. In other embodiments, blades 118 may be detachable such that the number and the placement may be varied.

Figure 5:
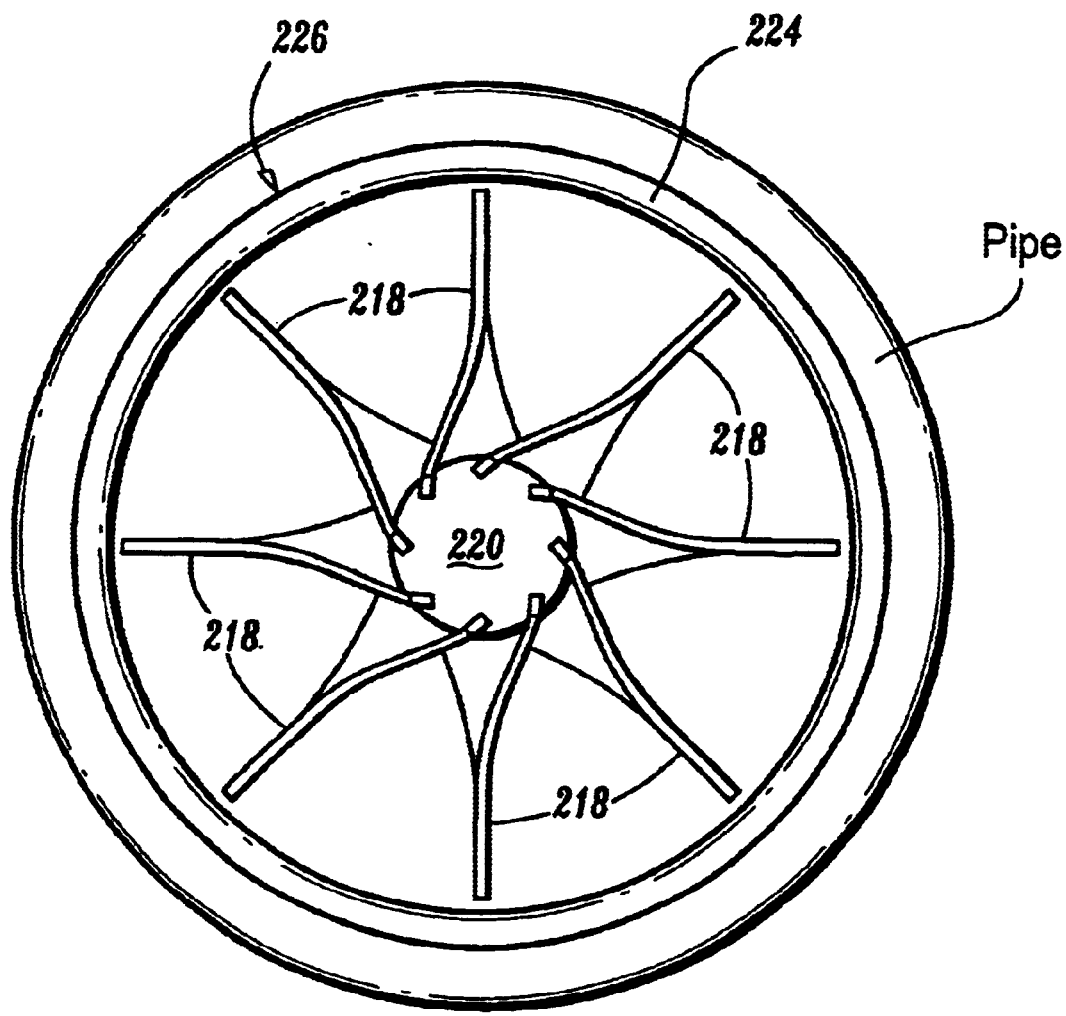
FIG. 5 is a front view of a flow conditioning device for use within an inside diameter of a pipe in accordance with the present invention.

Referring to FIG. 5, another embodiment of the present invention includes a flow conditioning device 226 which may be installed directly inside inner diameter of a pipe. Flow conditioning device 226 includes a ring portion 224 to which blades 218 are attached. A dowel 220 is provided for attaching the other end of blades 218. Flow conditioning device 226 may be employed in pipes or tubes without flanges. Flow conditioning device 226 may be welded into metal pipes or glued into plastic pipes. Other means for attaching flow conditioning device 226 are also contemplated. In one embodiment, multiple flow conditioners may be employed downstream of each other to condition flow.

Flowmeters are often provided which are calibrated for flow measurements for a specific pipe or condition. These conditions may not be the same in a factory or laboratory as they are in operation. The flow conditioning devices of present invention may be provided during calibration of the flowmeters to provide accurate and reliable flow measurements. In this way, upon using a flow conditioning device in the field, a better correlation between measurements of flowmeters as calibrated in the factory and the measurements of the flowmeters in the field is achieved. The flow conditioning device in accordance with the present invention causes a mixing of the fluid in the pipe to provide a flat flow profile or a plug flow profile. In this way, mathematical flow profile compensation is no longer needed. Advantageously, any change in calibration is minimized or eliminated even as fluid viscosity and Reynolds number change. The flow conditioning device overcomes upstream and downstream piping effects and will provide an excellent and stable calibration for flowmeters. The flow conditioning device installation in the factory and in the field preserves the factory calibration for flowmeters which will be installed in an arbitrary pipe configuration, and/or to assure the viability of a factory calibration when operating with a variety of different liquids in the actual installation.

Since clamp-on flowmeters are available pre-installed on spools or pipes, it is possible to install a flow conditioning device in an upstream flange or pipe.

Having described preferred embodiments for a flow profile conditioner for pipe flow systems (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. An apparatus for measuring flow in a pipe, comprising:
a first pipe having a first straight section for receiving fluid flow and a converging pipe structure positioned downstream of the first straight section for disturbing the fluid flow therethrough;
a flow condition apparatus mounted within a second pipe coupled to the first pipe and positioned downstream of the converging pipe structure, the flow conditioning apparatus including:
a ring for reducing the effective diameter of the second pipe;
a centrally disposed hub;
a plurality of angled members attached to the hub on a first end portion, the angled members having a second end portion extending radially outward from the hub;
the second end portion of the angled members being attached to the ring such that the plurality of angled members cause the disturbed fluid to swirl within the pipe, wherein a combination of the fluid swirling within the pipe and the reduced effective diameter of the pipe creates a symmetric flow profile; and
an ultrasonic flow measurement device mounted to the pipe to measure flow characteristics of the symmetric flow profile.

2. The apparatus as recited in claim 1, wherein the angled members include a twisted rectangular blade.

3. The apparatus as recited in claim 2, wherein the twisted rectangular blade includes a twist positioned closer to the hub than to the ring.

4. The apparatus as recited in claim 2, wherein the twisted rectangular blade is twisted by about 30 degrees.

5. The apparatus as recited in claim 1, wherein the second end portion of the angled members is directed perpendicular to flow in the pipe.

6. The apparatus as recited in claim 1, wherein the ring conforms to end flanges of pipes to permit installation of the apparatus between the pipes.

7. The apparatus as recited in claim 1, wherein the ring includes an outside diameter dimensioned and configured to fit inside the pipe.

8. The apparatus as recited in claim 1, wherein the plurality of angled members are equally spaced apart about the hub.

9. The apparatus as recited in claim 1, wherein the apparatus includes between six and twelve angled members.

10. The apparatus as recited in claim 1, wherein the flow measurement device is positioned between about 2 to about 4 pipe diameters from the flow conditioning apparatus.

11. The apparatus of claim 1 wherein the symmetric flow profile is a flat flow profile or a plug flow profile.

12. An apparatus for measuring flow in a pipe, comprising:
a receiving pipe section for receiving fluid flow;
a first pipe section including an end flange;
a second pipe section including an end flange;
a converging pipe structure connected to the receiving pipe section having a diameter smaller than the diameter of the receiving pipe section for causing a disturbed fluid flow;
a flow condition apparatus positioned downstream of the converging pipe structure and mounted between the end flanges of the first pipe section and the second pipe section, the flow conditioning apparatus including:
a centrally disposed hub;
a plurality of angled members attached to the hub on a first end portion, the angled members having a second end portion extending radially outward from the hub;
the second end portion of the angled members being attached to an inside diameter of a plate, wherein the plurality of angled members cause the disturbed fluid to swirl within the pipe and the inside diameter of the plate reduces the effective diameter of the pipe, and wherein a combination of the fluid swirling within the pipe and the reduced effective diameter of the pipe creates a symmetric flow profile in the pipe; and
an ultrasonic flow measurement device mounted externally to the pipe to measure flow characteristics of the symmetric flow profile.

13. The apparatus as recited in claim 12, wherein the angled members include a twisted rectangular blade.

14. The apparatus as recited in claim 13, wherein the twisted rectangular blade includes a twist positioned closer to the hub than to the ring.

15. The apparatus as recited in claim 13, wherein the twisted rectangular blade is twisted by about 30 degrees.

16. The apparatus as recited in claim 12, wherein the second end portion of the angled members is directed perpendicular to flow in the pipe.

17. The apparatus as recited in claim 12, wherein the plurality of angled members are equally spaced apart about the hub.

18. The apparatus as recited in claim 12, wherein the ring apparatus includes between six and twelve angled members.

19. The apparatus as recited in claim 12, wherein the ultrasonic flow measurement device is positioned between about 2 to about 4 pipe diameters form the flow conditioning apparatus.

20. The apparatus of claim 12, wherein the plate includes a hole pattern matching the hole patterns of the end flanges of the first and second pipe sections.

21. The apparatus of claim 12, wherein the symmetric flow profile is a flat flow profile or a plug flow profile.

* * * * *